United States Patent
Kaji et al.

(10) Patent No.: US 6,690,138 B2
(45) Date of Patent: Feb. 10, 2004

(54) ELECTRIC POWER STEERING SYSTEM

(75) Inventors: Hiroaki Kaji, Yamatokooriyama (JP);
Kazuyuki Yoshida, Sakurai (JP);
Nobuyuki Sasaguchi, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 91 days.

(21) Appl. No.: 09/867,698

(22) Filed: May 31, 2001

(65) Prior Publication Data

US 2002/0014877 A1 Feb. 7, 2002

(30) Foreign Application Priority Data

Jun. 2, 2000 (JP) ........................................ 2000-165637

(51) Int. Cl.⁷ .............................. H02H 5/04; B62D 5/04
(52) U.S. Cl. ..................... 318/783; 318/798; 318/806; 180/443
(58) Field of Search ................................ 318/783, 798, 318/806, 788, 473, 434; 180/443, 446, 6.28, 6.5

(56) References Cited

U.S. PATENT DOCUMENTS

| 4,064,387 | A | * | 12/1977 | McMullan | 219/217 |
| 4,396,353 | A | * | 8/1983 | MacDonald | 417/36 |
| 4,611,682 | A | | 9/1986 | Yasuda et al. | 180/79.1 |
| 4,721,894 | A | * | 1/1988 | Graber | 318/473 |
| 4,789,040 | A | * | 12/1988 | Morishita et al. | 318/473 |
| 4,924,031 | A | * | 5/1990 | Arai | 174/52.3 |
| 4,961,033 | A | * | 10/1990 | Hirota | 318/434 |
| 4,986,379 | A | * | 1/1991 | Morishita | 180/446 |
| 5,103,926 | A | * | 4/1992 | Ohno et al. | 180/446 |
| 5,623,409 | A | * | 4/1997 | Miller | 318/434 |
| 5,810,111 | A | * | 9/1998 | Takeuchi et al. | 318/471 |
| 6,046,560 | A | * | 4/2000 | Lu et al. | 318/473 |
| 6,268,669 | B1 | | 7/2001 | Wakao et al. | 310/67 R |
| 6,326,753 | B1 | * | 12/2001 | Someya et al. | 318/471 |
| 2001/0038661 | A1 | * | 11/2001 | Mori et al. | 374/45 |

FOREIGN PATENT DOCUMENTS

| EP | 0361725 A1 | | 4/1990 | |
| FR | 2776136 | | 9/1999 | |
| JP | 03098488 A | * | 4/1991 | .......... H02P/07/00 |
| JP | 11059444 | | 3/1999 | |
| WO | WO99/16654 | | 4/1999 | |

* cited by examiner

*Primary Examiner*—Robert Nappi
*Assistant Examiner*—Edgardo San Martin
(74) *Attorney, Agent, or Firm*—Rabin & Berdo, P.C.

(57) ABSTRACT

An electric power steering system is provided which assists a steering operation by applying a driving force generated by an electric motor to a steering mechanism of a motor vehicle. The system includes a sensor (e.g., a torque sensor) for acquiring information necessary for controlling the electric motor, and a board provided adjacent the electric motor and having a sensor signal processing circuit for processing a signal from the sensor. A temperature sensor for acquiring temperature information necessary for controlling the electric motor is mounted on the board.

7 Claims, 1 Drawing Sheet

ELECTRIC POWER STEERING SYSTEM

BACKGROUND OF THE INVENTION

1. Field of the Invention

The present invention relates to an electric power steering system which assists a steering operation by applying a driving force generated by an electric motor to a steering mechanism of a motor vehicle.

2. Description of Related Art

Electric power steering systems are conventionally available, which perform a steering assist operation by transmitting a torque (steering assist force) generated by an electric motor to a steering mechanism of a motor vehicle. In such an electric power steering system, an electric current command value, for example, is determined in accordance with a steering torque applied to a steering wheel and a vehicle speed. The electric motor is feedback-controlled on the basis of the electric current command value thus determined, whereby the steering assist force is properly applied to the steering mechanism.

If the motor vehicle is driven for a long time with the steering assist operation being frequently performed by the electric power steering system, a relatively great electric current is continuously applied to the electric motor. This may overheat the electric motor to an abnormally high temperature, causing a malfunction of the electric motor. A conventional approach to this problem is to take measures for protection of the motor, for example, by providing a heat sensing element within a housing covering the electric motor to limit the electric current command value on the basis of a temperature sensed by the heat sensing element.

To mount the heat sensing element within the housing of the electric motor, lead lines extending from plus and minus terminals of the heat sensing element should be led out of the housing, and gaps between the lead lines and the housing should be sealed for prevention of intrusion of moisture and the like into the motor. Therefore, the mounting of the heat sensing element in the conventional electric power steering system is troublesome, resulting in a cost increase.

One conceivable arrangement is such that the heat sensing element is mounted apart from the electric motor in a vehicle body rather than within the housing of the electric motor. More specifically, an ambient temperature around the electric motor is detected by the heat sensing element, and the temperature of the electric motor is calculated on the basis of the ambient temperature and the electric current applied to the electric motor. With this arrangement, however, the heat sensing element should be protected from moisture and the like, for example, by mounting the heat sensing element in a sealed case fixed to the vehicle body. This arrangement also entails the troublesome mounting of the heat sensing element.

SUMMARY OF THE INVENTION

It is an object of the present invention to provide an electric power steering system which requires less effort for the mounting of a temperature sensor such as a heat sensing element thereby to reduce the costs.

The electric power steering system according to the present invention comprises: a sensor for acquiring information necessary for controlling an electric motor; a board provided adjacent the electric motor and having a sensor signal processing circuit for processing a signal from the sensor; and a temperature sensor mounted on the board for acquiring temperature information necessary for controlling the electric motor.

According to the present invention, the temperature sensor is mounted on the board provided adjacent the electric motor. Therefore, the temperature sensor detects an ambient temperature therearound, and the temperature of the electric motor is calculated on the basis of the ambient temperature and an electric current applied to the electric motor, whereby a change in the temperature of the electric motor can indirectly be detected. Thus, the electric motor is prevented from being overheated to an abnormally high temperature, for example, by limiting the electric current flowing through the electric motor on the basis of the detection result obtained by the temperature sensor.

A temperature sensor which can automatically be mounted on the board with the use of an automatic mounting device may be used as the temperature sensor. This makes the mounting of the temperature sensor less troublesome. As a result, the production cost can be reduced.

The board is preferably housed in a water-tight case, and the case is preferably composed of a highly heat-conductive material. Where the board is housed in the case, it is necessary to lead a signal line out of the case for deriving a detection signal from the temperature sensor. The signal line is led out of the case, for example, through a water-tight grommet through which a signal line connected to the sensor signal processing circuit extends. Even with the temperature sensor mounted on the board, there is no need to alter the construction of the case which houses the board, and little effort is required for the lead-out of the signal line connected to the temperature sensor.

The temperature sensor is preferably connected to a ground line of the sensor signal processing circuit. This arrangement obviates a need for connecting one terminal of the temperature sensor to a lead line connected to an external ground line for grounding the terminal of the temperature sensor. Therefore, the number of required lead lines can be reduced by one as compared with the conventional construction in which the temperature sensor is provided within the electric motor, thereby reducing the costs of the electric power steering system.

The inventive electric power steering system preferably further includes a motor controlling circuit for controlling the electric motor on the basis of a signal processed by the sensor signal processing circuit and the detection signal of the temperature sensor. Thus, the electric current flowing through the electric motor can be limited on the basis of the detection result obtained by the temperature sensor for controlling the electric motor. This prevents the electric motor from being overheated to an abnormally high temperature.

The foregoing and other objects, features and effects of the present invention will become more apparent from the following description of the preferred embodiments with reference to the attached drawings.

DESCRIPTION OF THE PREFERRED EMBODIMENTS

Figure 1:
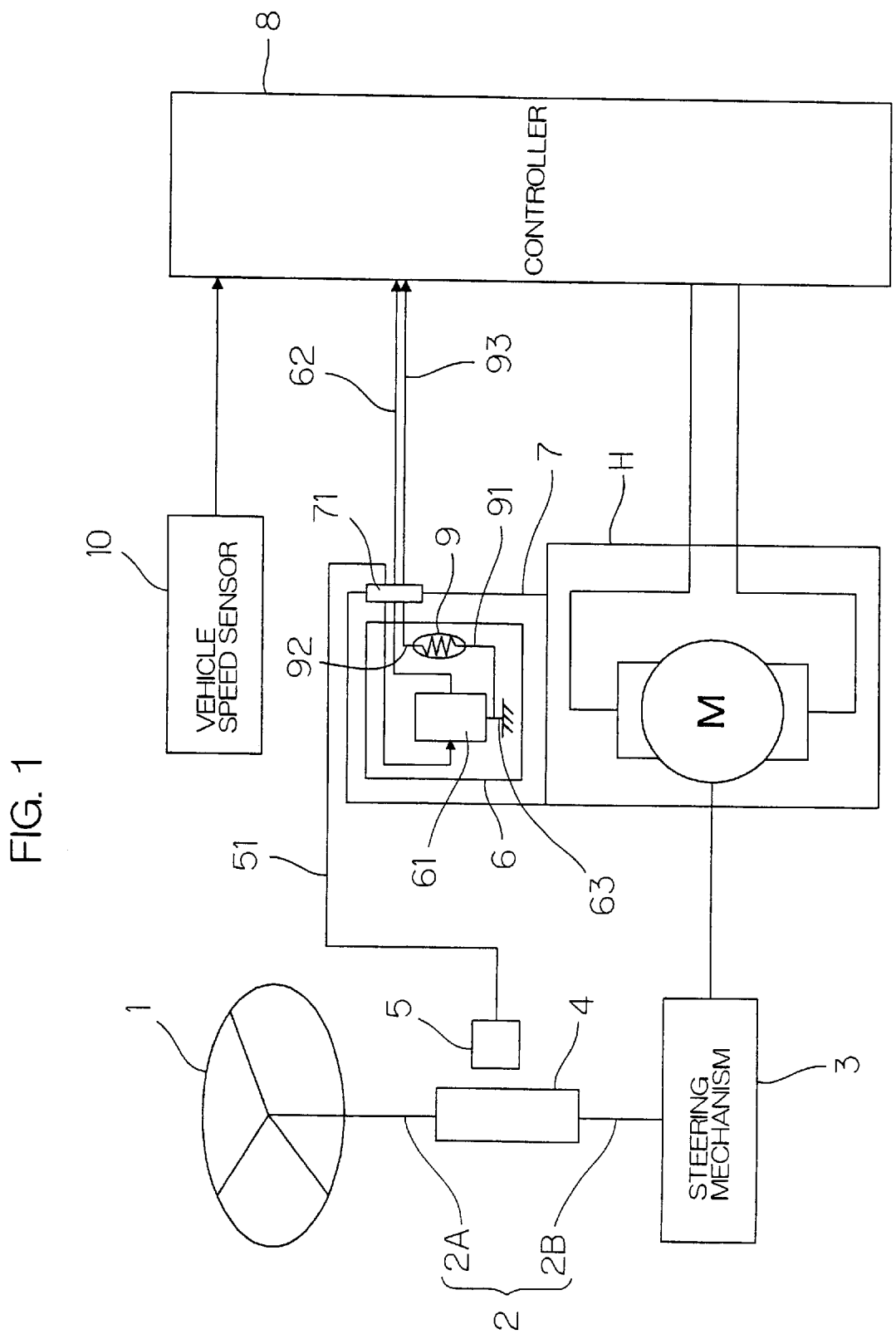
FIG. 1 is a block diagram illustrating the electrical construction of an electric power steering system according to one embodiment of the present invention.

FIG. 1 is a block diagram illustrating the electrical construction of an electric power steering system according to one embodiment of the present invention. A steering torque applied to a steering wheel 1 is mechanically transmitted to a steering mechanism 3 via a steering shaft 2. At this time, a torque (steering assist force) is applied to the steering mechanism 3 from an electric motor M for steering assist. The electric motor M is housed, for example, in an aluminum motor housing H.

The steering shaft 2 is divided into an input shaft 2A coupled to the side of the steering wheel 1 and an output shaft 2B coupled to the side of the steering mechanism 3. The input shaft 2A and the output shaft 2B are coupled to each other by a torsion bar 4. The torsion bar 4 experiences a torsion in accordance with the steering torque, and the direction and magnitude of the torsion are detected by a torque sensor 5. Usable as the torque sensor 5 is, for example, a magnetic torque sensor adapted to detect a magnetic resistance which changes with a change in the angular positional relation between the input shaft 2A and the output shaft 2B.

An output signal of the torque sensor 5 is inputted to a sensor signal processing board 6. More specifically, the sensor signal processing board 6 is housed, for example, in an aluminum board case 7 fixed in contact with the motor housing H. The sensor signal processing board 6 includes an amplification circuit 61 for amplifying the output signal of the torque sensor 5. The output signal of the torque sensor 5 is inputted to the amplification circuit 61 via a signal line 51. The signal amplified by the amplification circuit 61 is inputted to a controller 8 (ECU) via a signal line 62.

A temperature sensor 9 for detecting an ambient temperature around the sensor signal processing board 6 is mounted on the sensor signal processing board 6. The temperature sensor 9 is of a board-mounting type, which is fabricated by sealing a heat sensing element such as a thermistor in a resin or a glass. The temperature sensor 9 of this type can automatically be mounted on the sensor signal processing board 6, for example, with the use of an automatic mounting device. Therefore, the mounting of the temperature sensor 9 is not troublesome.

In this embodiment, a minus terminal 91 of the temperature sensor 9 is connected to a ground line 63 of the sensor signal processing board 6. Hence, there is no need to introduce a lead line into the board case 7 for connection between the minus terminal 91 of the temperature sensor 9 and an external ground line provided outside the board case 7 for grounding the minus terminal 91 of the temperature sensor 9. Therefore, the number of required lead lines can be reduced by one as compared with a case where the temperature sensor 9 is provided within the electric motor M, thereby reducing the costs of the system.

On the other hand, a plus terminal of the temperature sensor 9 is connected to the controller 8 via a signal line 93, and a signal having a level according to the temperature detected by the temperature sensor 9 is inputted to the controller 8. The signal line 93 extending from the temperature sensor 9, the signal line 62 extending from the amplification circuit 61 and the signal line 51 for inputting the output signal of the torque sensor 5 to the amplification circuit 61 are bundled and inserted through a water-tight grommet 71 such as of a rubber. The water-tight grommet 71 is liquid-tightly fitted in an opening formed in the board case 7, whereby the water tightness of the board case 7 can be ensured.

A signal from the vehicle speed sensor 10 is also inputted to the controller 8. On the basis of the output signals of the torque sensor 5 and the vehicle speed sensor 10, the controller 8 determines an electric current command value which is indicative of the value of an electric current to be applied to the electric motor M. The controller 8 feedback-controls the electric motor M on the basis of a deviation of the motor electric current actually flowing through the electric motor M from the electric current command value. Thus, the electric motor M properly generates a torque, whereby a satisfactory steering feeling can be provided.

Where the temperature of the electric motor M calculated on the basis of the temperature detected by the temperature sensor 9 and the value of the electric current to be applied to the electric motor M is higher than a predetermined level, the controller 8 limits the electric current command value in accordance with the calculated temperature to prevent the electric motor M from being overheated to an abnormally high temperature.

More specifically, the board case 7 containing the temperature sensor 9 is composed of the same material (aluminum) as the motor housing H as described above, and fixed to the motor housing H. When the temperature of the motor housing H changes with the change in the ambient temperature around the electric motor M, heat is conducted from the motor housing H to the board case 7, so that an ambient temperature within the board case 7 changes with the change in the temperature of the motor housing H. Since the temperature detected by the temperature sensor 9 changes with the change in the ambient temperature around the electric motor M, the electric motor M is properly prevented from being overheated to an abnormally high temperature by limiting the electric current command value in accordance with the temperature of the electric motor M calculated on the basis of the temperature detected by the temperature sensor 9 and the value of the electric current to be applied to the electric motor M.

In accordance with this embodiment, the temperature sensor 9 required for the limitation of the electric current command value for preventing the electric motor M from being overheated to an abnormally high temperature is provided within the board case 7, as described above, in which the ambient temperature changes with heat generation by the electric motor M. Thus, the change in the temperature of the electric motor M can indirectly be detected, and the electric current command value can properly be limited on the basis of the detection result.

Since the temperature sensor 9 can automatically be mounted on the sensor signal processing board 6 to be housed in the board case 7, little effort is required for the mounting of the temperature sensor 9. Further, the signal line 93 connected to the plus terminal 92 of the temperature sensor 9 and the signal lines 51, 62 are led out of the board case 7 through the water-tight grommet 71. This obviates the need for the alteration of the construction of the board case 7 and requires little effort for the lead-out of the signal line 93.

In accordance with this embodiment, only the temperature sensor 9 is additionally mounted on the sensor signal processing board 6. Hence, there is no need to drastically alter the construction of the sensor signal processing board 6 with no increase in the costs of the sensor signal processing board 6.

In this embodiment, the amplification circuit 61 and the temperature sensor 9 share the ground line 63, so that the number of the required lead lines is reduced by one. This allows for cost reduction of the electric power steering system.

While the embodiment of the present invention has thus been described, the invention may be embodied in any other ways. Although the temperature sensor 9 is mounted on the sensor signal processing board 6 adapted to process the signal from the torque sensor 5 in the embodiment described above, the temperature sensor 9 may be mounted on a sensor signal processing board for processing an output signal from any other sensor (e.g., the vehicle speed sensor 10, a steering torque sensor for detecting the steering angle of the steering wheel 1, or the like) as long as the processing board is disposed in an environment where an ambient temperature changes with the change in the ambient temperature around the electric motor M.

The board case 7 is composed of aluminum in the aforesaid embodiment, but may be composed of a highly heat conductive material other than aluminum.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

This application corresponds to Japanese Patent Application No. 2000-165637 filed to the Japanese Patent Office on Jun. 2, 2000, the disclosure thereof being incorporated herein by reference.

What is claimed is:

1. An electric power steering system which assists a steering operation by applying a driving force generated by an electric motor to a steering mechanism of a motor vehicle, the electric motor being housed in a motor housing, the electric power steering system comprising:

a sensor for acquiring information necessary for controlling the electric motor;

a board having a sensor signal processing circuit for processing a signal from the sensor;

a temperature sensor mounted on the board for acquiring temperature information necessary for controlling the electric motor; and a board case disposed outside the motor housing but mounted in contact with the motor housing, the board being housed in the board case.

2. An electric power steering system as set forth in claim 1, wherein the temperature sensor is connected to a ground line of the sensor signal processing circuit.

3. An electric power steering system as set forth in claim 1, further comprising a motor controlling circuit for controlling the electric motor on the basis of a signal processed by the sensor signal processing circuit and a detection signal of the temperature sensor.

4. An electric power steering system as set forth in claim 3, wherein the motor controlling circuit limits an electric current flowing through the electric motor on the basis of an output signal of the temperature sensor to prevent the electric motor from being overheated to a predetermined abnormally high temperature.

5. An electric power steering system as set forth in claim 1, wherein the temperature sensor includes a temperature sensor of a board-mounting type.

6. An electric power steering system as set forth in claim 1, wherein the board case is a water-tight case.

7. An electric power steering system as set forth in claim 6, wherein a signal line of the temperature sensor and a signal line connected to the sensor signal processing circuit are led out of the board case through a water-tight grommet.

* * * * *